May 6, 1930.  J. J. MURRAY  1,757,648
MECHANISM FOR SPRAYING CARDS
Filed May 7, 1929    4 Sheets-Sheet 1
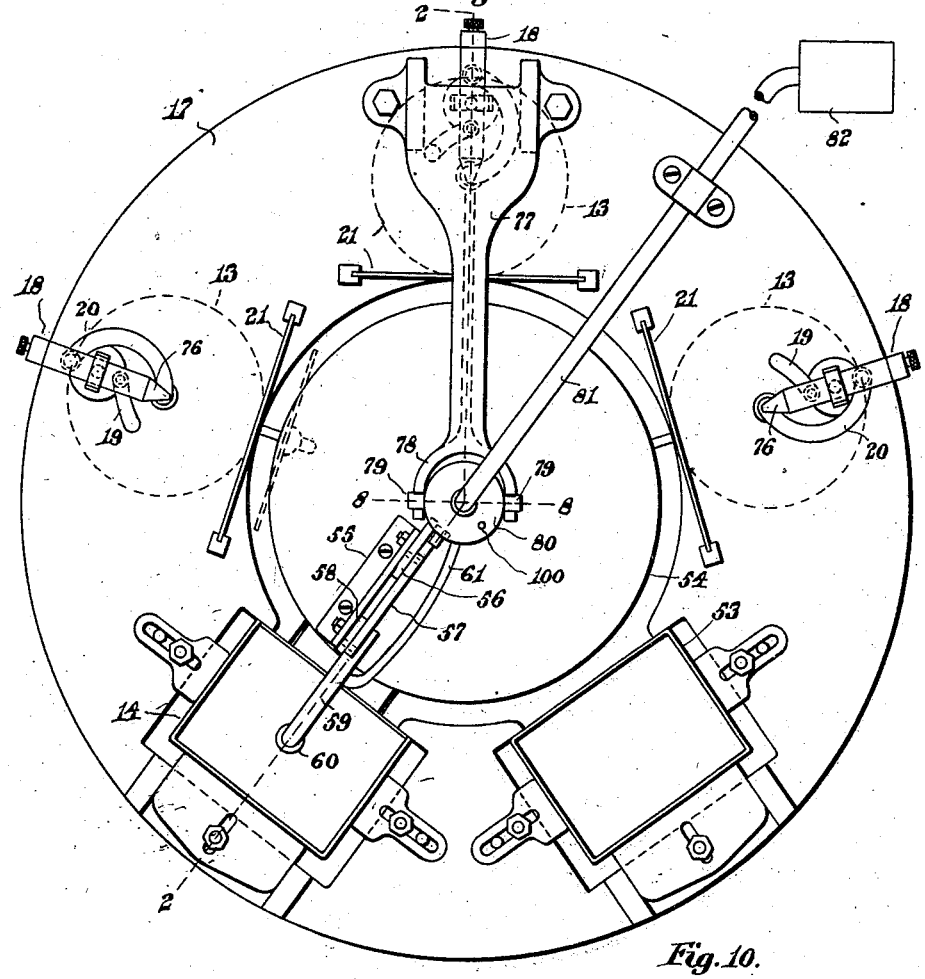
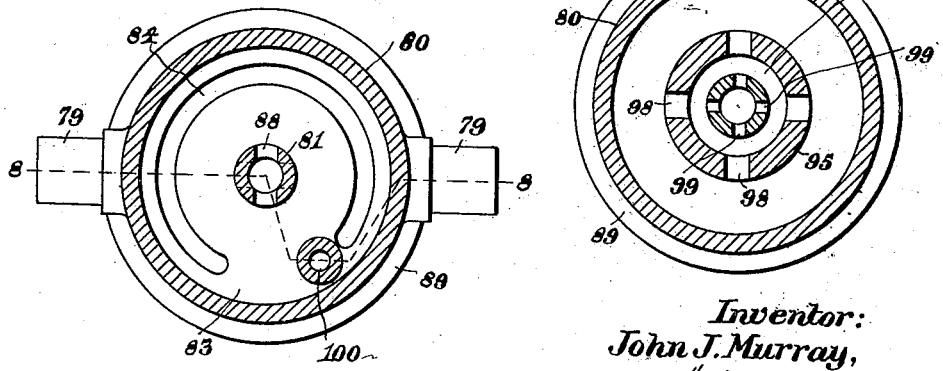
Inventor:
John J. Murray,
by Walter E. Lombard,
Atty.

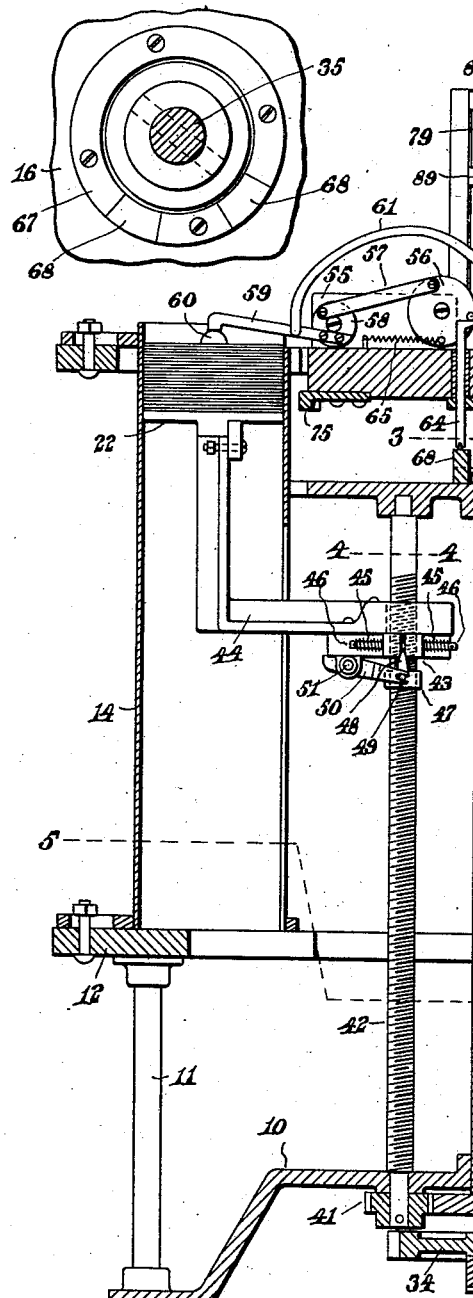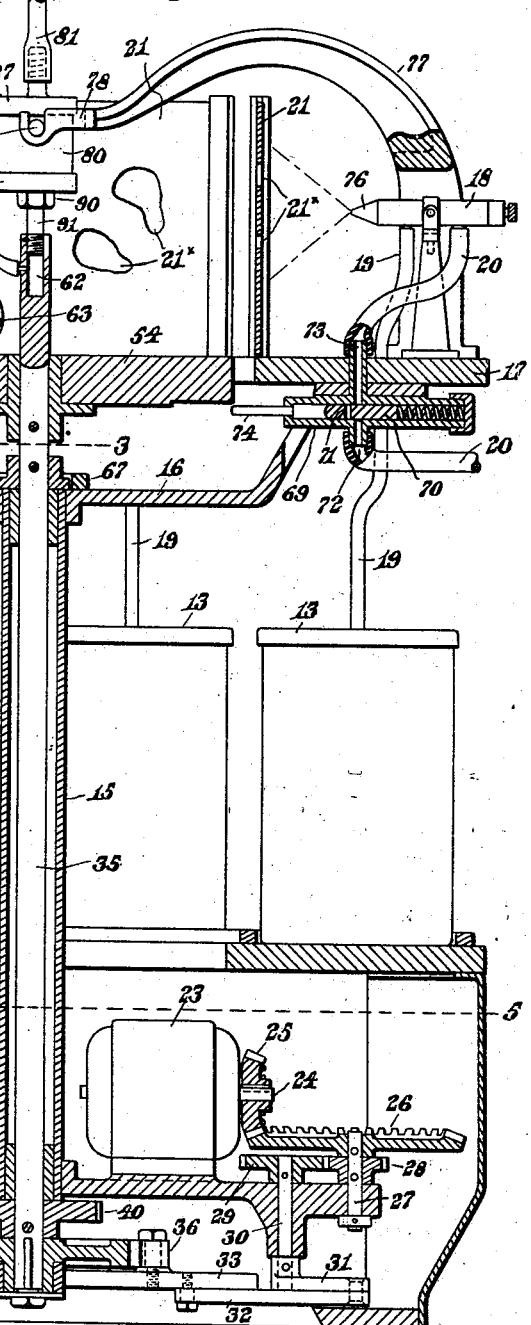

May 6, 1930.   J. J. MURRAY   1,757,648
MECHANISM FOR SPRAYING CARDS
Filed May 7, 1929   4 Sheets-Sheet 3
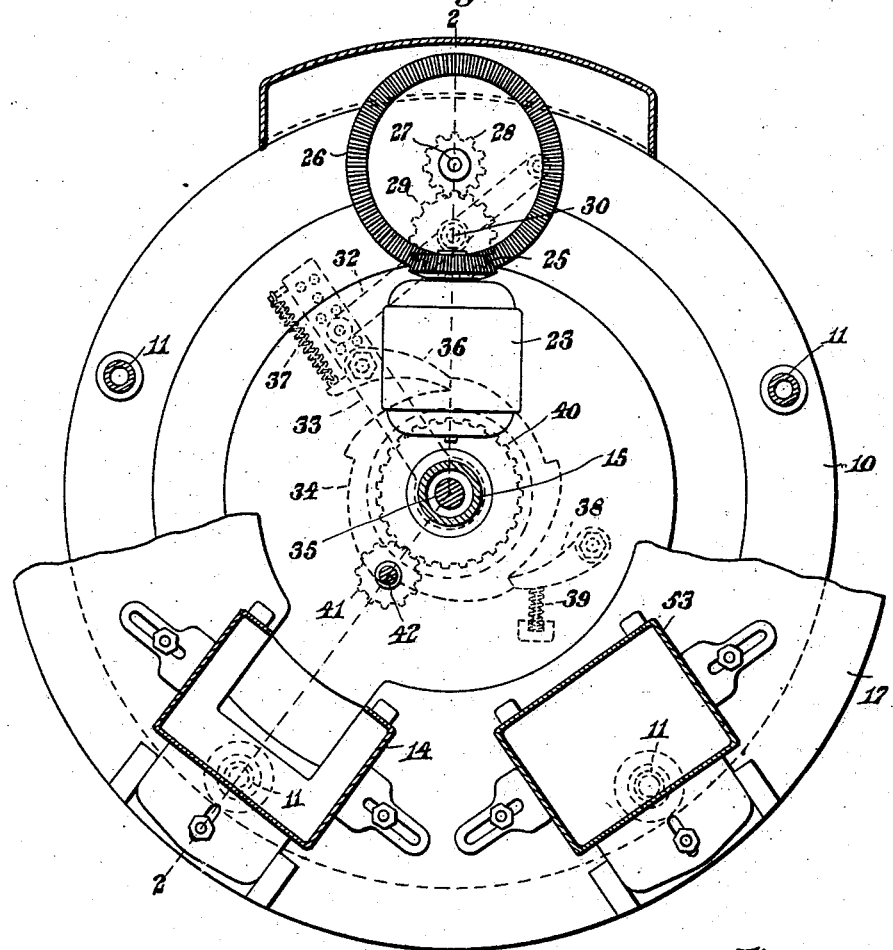
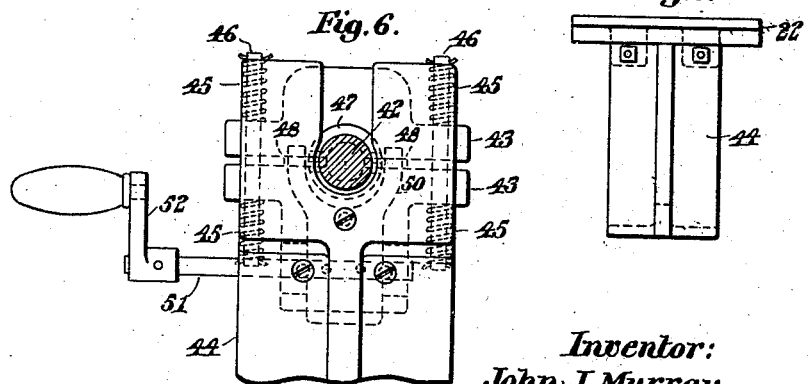
Inventor:
John J. Murray,
by Walter E. Lombard
Atty.

May 6, 1930.                J. J. MURRAY                 1,757,648
                    MECHANISM FOR SPRAYING CARDS
                       Filed May 7, 1929          4 Sheets-Sheet 4
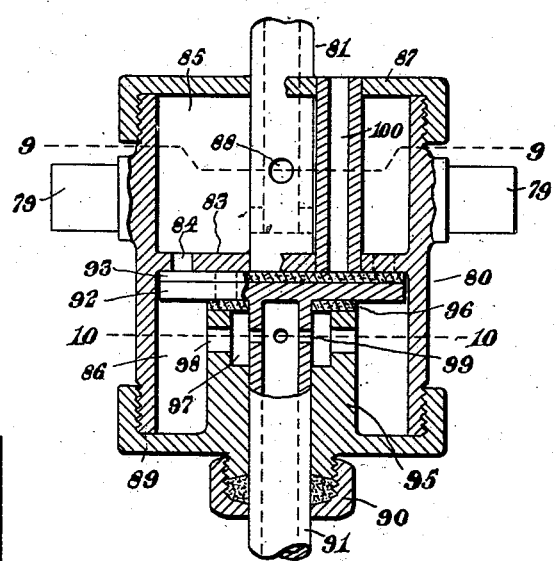
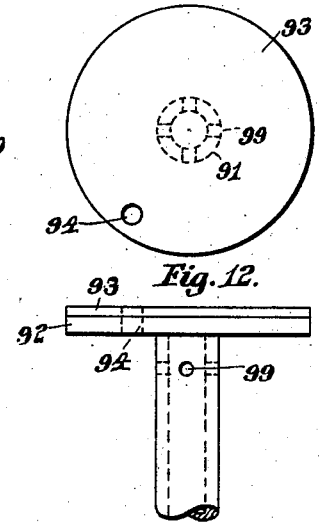
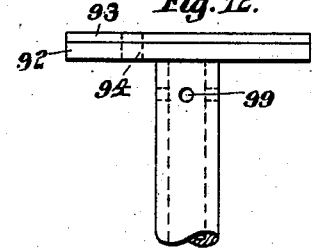
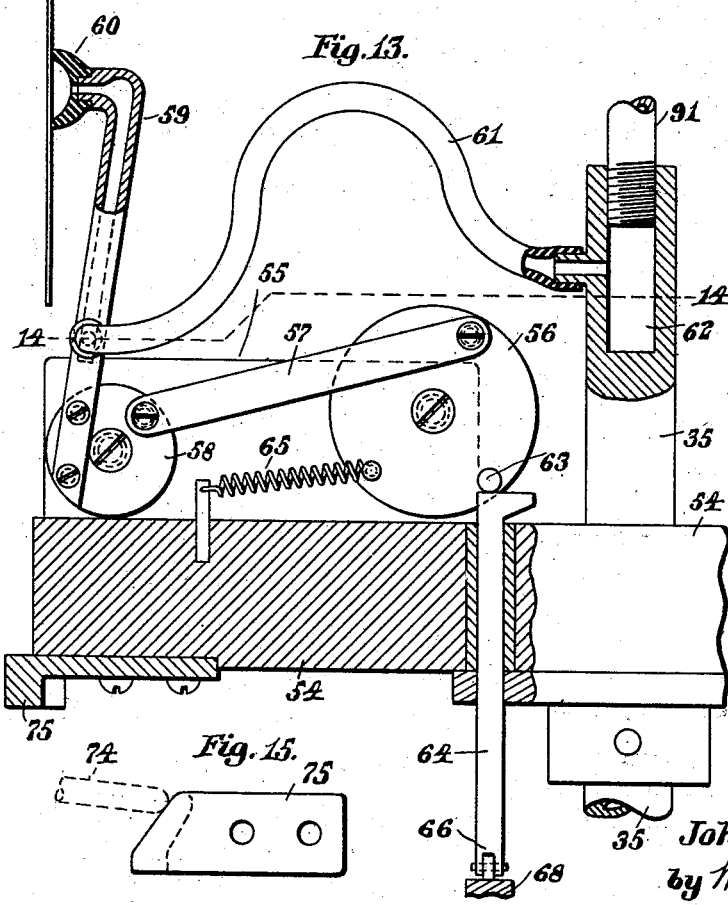
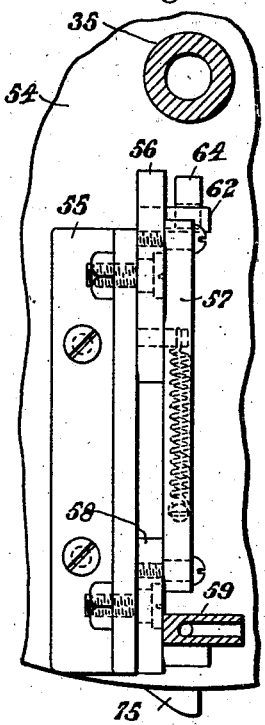
Inventor:
John J. Murray,
by Walter E. Lombard.
Atty.

Patented May 6, 1930

1,757,648

UNITED STATES PATENT OFFICE

JOHN J. MURRAY, OF ARLINGTON, MASSACHUSETTS

MECHANISM FOR SPRAYING CARDS

Application filed May 7, 1929. Serial No. 361,228.

This invention relates to spraying mechanisms and has for its object the production of an apparatus by which a card or similar object may have successively applied thereto a plurality of block tints preparatory to the printing or engraving of a design thereon.

This object is attained by the mechanism illustrated in the accompanying drawings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings:

Figure 1 represents a plan of a machine embodying the principles of the present invention.

Figure 2 represents a vertical section of same on line 2, 2, on Fig. 1.

Figure 3 represents a horizontal section on line 3, 3, on Fig. 2.

Figure 4 represents an elevation of the cam for actuating the card supporting mechanism.

Figure 5 represents a horizontal section on line 5, 5, on Fig. 2.

Figure 6 represents a horizontal section on line 6, 6, on Fig. 2.

Figure 7 represents an elevation of the lifter in card receptacle.

Figure 8 represents a vertical section of the vacuum valve, on line 8, 8, on Figs. 1 and 9.

Figure 9 represents a horizontal section on line 9, 9, on Fig. 8.

Figure 10 represents a horizontal section on line 10, 10, on Fig. 8.

Figure 11 represents a plan of rotary piston in vacuum valve.

Figure 12 represents an elevation of said piston.

Figure 13 represents an elevation of card supporting mechanism partly in section.

Figure 14 represents a horizontal section on line 14, 14, on Fig. 13, and

Figure 15 represents a plan of the cam for actuating the valve of the spraying device.

Similar characters indicate like parts throughout the several figures of the drawing.

In the drawings, 10 is a base having secured thereto the uprights 11 on the upper end of which is a support 12 provided with a plurality of paint receptacles 13 and a card receptacle 14.

Secured to the base 10 and extending upwardly therefrom is a hollow column 15 having secured to its upper end the cup-shaped member 16 supporting an annular table 17.

Secured to the upper face of the table 17 are a plurality of spraying devices 18 which may be of any well known construction, each spraying device 18 being connected by a tube 19 to one of the paint receptacles 13.

Each paint receptacle 13 has a different color therein.

Each spraying device 18 has extending therefrom an air tube 20, this tube extending to any suitable device for forcing air through the spraying device 18 and causing the discharge of a color from the nozzle thereof in the form of a spray.

In front of each spraying device and fixed to the annular table 17 is a screen stencil 21 adapted to have different shaped openings 21ˣ cut therein through which the spray of color may be discharged onto a card supported by suitable means on the opposite side of said screen.

These cards to be ornamented are disposed in the receptacle 14 and are supported on the lifter 22 adapted to be raised during the operation of the machine.

On the base 10 is a motor 23 having secured to its driving shaft 24 a bevel gear 25 meshing with a bevel gear 26 secured to and revoluble with the shaft 27.

This shaft 27 has also mounted thereon a spur gear 28 which meshes with a spur gear 29 on a shaft 30.

The shafts 27 and 30 are revoluble in suitable bearings formed in the base 10.

The lower end of the shaft 30 has a lever 31 secured thereto, the outer end of which is connected by a link 32 to an arm 33 revoluble about the hub of a ratchet 34 keyed to a shaft 35 extending upwardly through the center of the hollow column 15.

This arm 33 has pivotally secured thereto a pawl 36 held in engagement with the teeth of the ratchet 34 by means of the spring 37.

Another pawl 38 is held in engagement with the teeth of the ratchet 34 by means of the spring 39, this pawl 38 preventing rotation of the ratchet 34 in a reverse direction.

By means of this mechanism an intermittent rotary movement is imparted to the shaft 35, said shaft coming to a standstill while the arm 33 is moving about the axis of the shaft 35 preparatory to engaging the pawl 36 with another tooth of said ratchet.

The shaft 35 also has secured thereto a spur gear 40 engaging with a pinion 41 secured to the lower end of a vertical screw 42 revoluble in bearings in the members 10 and 16.

The threads of this screw 42 are normally engaged with threads of a split nut 43 mounted on the under side of the support 44 having the card lifter 22 secured to the upper end thereof.

The two parts of the nut 43 are moved toward each other by means of the springs 45 surrounding pins 46 extending through oppositely disposed ears on the two parts of said nut.

When the screw 42 is rotated the support 44 will be raised causing the card lifter 22 to move upwardly, thereby insuring the upper card in the stack upon the lifter 22 being substantially on the level with the upper face of the annular table 17.

In other words, when one card is removed from the receptacle, the stack of cards will be moved upwardly so that the next card will occupy the same position previously occupied by the card removed.

Beneath the split nut 43 and surrounding the screw 42 is a collar 47 having upwardly extending wedges 48 thereon, the upper ends of which are interposed between the two parts of the split nut 43.

The collar 47 has trunnions 49 extending therefrom into slots formed in the bifurcated end of a lever 50 secured to a shaft 51 which is mounted in bearings projecting downwardly from the support 44.

This shaft 51 has secured thereto an actuating crank 52 by which the shaft 51 may be oscillated to move the wedges 48 upwardly and separate the two parts of the nut 43 when it is desired to lower the lifter 22 preparatory to filling the receptacle with a new supply of cards.

During the operation of the machine the springs 45 will retain the threads of the nut 43 in engagement with the threads of the revoluble screw 42.

The inner wall of the card receptacle 14 is fixedly secured to the table 17 while the side walls and outer wall of said receptacle are adjustably secured to the table 17 so that said receptacle may be adapted to accommodate different sizes of cards, all as shown in Figs. 1 and 5 of the drawings.

On the table 17 is also mounted another receptacle 53 to receive the cards after the various colors have been applied thereto.

The cards are taken from the receptacle 53 and then transferred to another machine by which the engraving is superimposed upon the colors which have been applied by the machine herein shown and described.

Within the annular table 17 is a rotatable disk or turn-table 54 secured to the revoluble shaft 35.

The upper face of this disk or turntable 54 is in the same horizontal plane as the upper face of the annular table 17.

Secured to the disk or turntable 54 is a support 55 having rotatably mounted on one side face thereof a wheel 56 connected by a link 57 to a disk 58 rotatably mounted upon the side face of a said support 55.

Secured to the disk 58 is an arm 59, the outer end of which is tubular and connects with a vacuum cup 60 of usual construction.

With the tubular portion of the arm 59 one end of a flexible tube 61 communicates, the opposite end of said tube communicating with a chamber 62 in the upper end of the revoluble shaft 35.

The wheel 56 has a pin 63 extending laterally therefrom which is held in contact with a lifter 64 by means of a spring 65 as shown in Fig. 2 of the drawings.

This lifter 64 has a roller 66 revolubly mounted in its lower end which roller rests upon a ring 67 secured to the cup-shaped member 16.

This ring 67 is provided with two upwardly extending cam projections 68 which at proper times in the rotation of the turntable 54 will raise the lifter 64 to move the wheel 63 about its pivot and through the link 57 impart a quarter turn to the disk 58 lowering the vacuum cup 60 into a horizontal position.

At this time there is a vacuum in the cup 60 which will cause said cup to seize the upper card in the receptacle 14 preparatory to raising it into a vertical position, when the lifter 64 moves downwardly during the rotation of the turntable 54.

The upper card in the receptacle 14 having been raised into vertical position in this manner, the next movement of the ratchet 34 will cause the turntable 54 to be moved about the axis of the shaft 35 until the card is positioned opposite the first screen 21.

The turntable 54 will then come to a standstill while the pawl 36 is moving in a reverse direction preparatory to engaging another tooth of the ratchet 34.

While the card thus raised is at a standstill opposite the screen 21, the spraying device 18 will operate causing a spray of paint to be forced through the openings 21× in the stencil 21 onto the card.

The mechanism for operating the spraying device 18 at this time is shown in Fig. 2 of the drawings.

This mechanism consists of a valve located in the air tube 20, this valve consisting of a casing 69 having therein a spring pressed plunger 70 provided with a transverse opening 71 normally out of alinement with the inlet passage 72 and outlet passage 73 of the valve casing 69.

The plunger 70 has an extension 74 which is adapted to be engaged by a finger 75 secured to the turntable 54.

The finger 75 is so located upon the turntable 54 that at the proper time it will come into contact with the extension 74 and force the plunger 70 outwardly until the passage 71 is in alinement with the inlet and outlet passages 72, 73.

When these passages 71, 72, 73 are in alinement air from any suitable source of supply and under pressure will be forced into the spraying device 18 to be discharged from the nozzle 76 thereof.

The force of the air passing through the spraying device 18 will draw the paint through the pipe 19 and cause it to be sprayed from the nozzle 76, all as is usual in spraying devices of this character.

Secured to the upper face of the annular table 17 is a bracket 77, the inner end of which is bifurcated, as at 78, and has recesses therein to support the oppositely disposed trunnions 79 of a valve casing 80.

From the upper end of this valve casing 80 extends a tube 81 to a vacuum pump 82 which may be of any well known construction.

The casing 80 has a partition 83 extending across the inner chamber thereof, this partition having a concentric elongated opening 84 therethrough connecting the upper chamber 85 with the lower chamber 86.

The upper chamber 85 is closed by a cap 87 through which the tube 81 extends to the partition 83.

This tube has a plurality of openings 88 communicating with the chamber 85.

The lower chamber 86 is closed by a cap 89 having a stuffing box 90 mounted thereon through which extends a tubular member 91, the lower end of which is secured to the revoluble shaft 35 and communicates with the chamber 62 in the upper end of said revoluble shaft.

The upper end of the tubular member 91 is provided with a disk 92 having secured to the upper face thereof a sheet of resilient packing material 93.

Through the disk 92 and sheet 93 extends a port 94 which in the rotation of the shaft 35 communicates with the elongated opening 84.

The cap 89 has on its inner face a chambered hub 94 on the upper end of which is superimposed a packing ring 96 contacting with the under face of the disk 92.

Within the upper end of the hub 95 is an annular chamber 97 having passages 98 therefrom communicating with the lower chamber 86.

The tubular member 91 is provided with a plurality of radial openings 99 which are at all times in communication with the chamber 97.

Extending upwardly from the lower chamber 86 and through the upper chamber 85 and the cap 87 is a cylindrical member 100 having a vent passage therethrough.

During the rotation of the shaft 35, the tubular member 91 connected therewith, and the disk 92 on the upper end of the tubular member, the port 94 will be in communication with the elongated opening 84 during most of the cycle.

While this port 94 is in communication with the elongated opening 84, the vacuum pump 82 will draw the air from both chambers 85 and 86, and also through the tubular member 91, tube 61, and arm 59 from the vacuum cup 60.

When the air is thus withdrawn from the vacuum cup 60, it will be in condition to seize a card from the receptacle 14 and retain its grip thereon while the arm 59 is moved into vertical position and also while the card is carried by said arm to positions opposite the various screens 21.

After the card has passed the last screen 21 and the arm 59 is opposite the card receiving receptacle 53, the port 94 will pass the end of the elongated opening 84 and close all communication between the two chambers.

In this manner the vacuum will be cut off and at substantially the same time the port 94 will register with the vent 100 admitting air to the lower chamber 86, which air passes through the tubular member 91, tube 61 and arm 59 to the vacuum cup 60 and releases the card from said cup 60, thus permitting the card to drop into the receptacle 53.

When the receptacle 14 requires a new supply of cards the operator by means of crank 52 turns the shaft 51 sufficiently to cause the wedges 48 to separate the two parts of the nut 43 and disengage the threads thereof from the screw 42.

The lifter 22 may then be lowered quickly to the bottom of the receptacle 14 and a new supply of cards placed on top of said lifter preparatory to further operation of the machine.

When the receptacle 14 is filled with cards and the motor 23 is placed in operation, an intermittent rotation will be imparted to the shaft 35 and through the gears 40, 41 to the screw 42.

This intermittent rotation will also be imparted to the vacuum valve disk 92 and the turntable 54.

While the turntable 54 is at a standstill in the position indicated in Fig. 2, the vacuum cup 60 will be in contact with the upper card in the receptacle and grip the same, the vacuum valve at this time being open.

When the turntable begins to rotate, the spring 65 will act to raise the arm 59 into the position indicated in Fig. 13 of the drawings, bringing the card gripped by the vacuum cup 60 into a vertical position, the lifter 64 at this time passing downwardly from the cam throw 68 of the fixed cam 67.

A continued rotation of the turntable 54 brings the card opposite to the first screen 21 where it comes to a standstill, and at this time the finger 75 upon the turntable acts upon the plunger 70 moving it into position to admit air to the first spraying device 18 and causing a spray to be forced through the openings 21ˣ in the screen onto the face of the card.

When this has been accomplished the turntable 54 continues its movement, the valve plunger 70 is moved into closed position and the card is carried by its support to the next screen 21.

The turntable 54 then comes to a standstill and another color of paint is sprayed through the openings in the second screen onto the card.

Subsequently, the turntable 54 is rotated further until the card stops opposite the third screen to permit another color of paint to be sprayed upon said card.

While in the drawings only three screens 21 and three spraying devices 18 are shown, it is obvious that any number of spraying devices and screens may be used.

After the last screen 21 has been passed by the card, the card will be released from the cup in the manner hereinbefore described, the arm 59 at this time being moved into a substantially horizontal position by the lifter 64 being elevated by the second cam throw 68.

The vent 100 does not register with the port 94 until the arm 59 has been moved into this substantially horizontal position.

It is believed that the operation and many advantages of the invention will be understood without further description.

Having thus described my invention, I claim:

1. The combination of a fixed annular table; a spraying device thereon; a perforated screen in front of said spraying device; a revoluble disk within said annular table; a card support on said disk; means for intermittently rotating said disk and moving said card support to a position opposite said screen; and means for actuating said spraying device only while said disk is at rest whereby a color may be discharged through said screen onto the card carried by said support.

2. The combination of a fixed annular table; a plurality of spraying devices thereon; a perforated screen in front of each spraying device; a revoluble disk within said annular table; a card support on said disk; means for intermittently rotating said disk and moving said card support successively to positions opposite the various screens; and means for actuating said spraying devices only while said disk is at rest whereby a different color may be discharged through each screen onto the card carried by said support.

3. The combination of a fixed annular table; a spraying device thereon; a perforated screen in front of said spraying device; a revoluble disk within said annular table; a card receptacle; means including a vacuum cup carried by said disk adapted to seize a card from said receptacle and move it into vertical position; means for intermittently rotating said disk and moving said card support to a position opposite said screen; and means for actuating said spraying device only while said disk is at rest whereby a color may be discharged through said screen onto the card carried by said support.

4. The combination of a fixed annular table; a spraying device thereon; a perforated screen in front of said spraying device; a revoluble disk within said annular table; a card receptacle; means including a vacuum cup carried by said disk adapted to seize a card from said receptacle and move it into vertical position; means for intermittently rotating said disk and moving said card support to a position opposite said screen; means for actuating said spraying device only while said disk is at rest whereby a color may be discharged through said screen onto the card carried by said support; a card receiver; and means for admitting air to said cup when opposite the card receiver.

5. The combination of a fixed annular table; a spraying device thereon; a perforated screen in front of said spraying device; a revoluble disk within said annular table; a card receptacle; means including a vacuum cup carried by said disk adapted to seize a card from said receptacle and move it into vertical position; means for intermittently rotating said disk and moving said card support to a position opposite said screen; means for actuating said spraying device only while said disk is at rest whereby a color may be discharged through said screen onto the card carried by said support; and automatic means for raising the cards in said receptacle.

6. The combination of a fixed annular table; a plurality of spraying devices thereon; a perforated screen in front of each spraying device; a turntable within said annular table; a card support on said turntable; means for intermittently rotating said turntable and moving said card support to positions opposite said screens; means for actuating said spraying devices only while said turntable is at rest whereby a color may be discharged through each screen onto the card carried by said support; and means for discharging the card from its support at a predetermined time.

7. The combination of a fixed annular table; a plurality of spraying devices thereon; a perforated screen in front of each spraying device; a turntable within said annular table; a card support on said turntable; means for intermittently rotating said turntable and moving said card support successively to positions opposite the various screens; means for stopping temporarily the rotation of said turntable when the card support is opposite a screen; and means for actuating said spraying devices only while said turntable is at rest whereby a different color may be discharged through each screen onto the card carried by said support.

8. The combination of a fixed annular table; a plurality of spraying devices thereon; a perforated screen in front of each spraying device; a turntable within said annular table; a card receptacle; means including a vacuum cup carried by said turntable adapted to seize a card from said receptacle and move it into vertical position; a valve controlling the vacuum in said cup; means for intermittently rotating said turntable and moving said card support to positions opposite said screen; means for actuating said spraying devices only while said turntable is at rest whereby a color may be discharged through each screen onto the card carried by said support; and means for closing said valve at a predetermined time.

9. The combination of a fixed annular table; a plurality of spraying devices thereon; a perforated screen in front of each spraying device; a turntable within said annular table; a card receptacle; means including a vacuum cup carried by said turntable adapted to seize a card from said receptacle and move it into vertical position; means for intermittently rotating said turntable and moving said card support to positions opposite said screens; an air tube for admitting air under pressure to each spraying device; a valve in each air tube; means movable with said turntable for opening said valves and actuating said spraying devices at predetermined times; a card receiver; and means for admitting air to said cup when opposite the card receiver.

10. The combination of a fixed annular table; a plurality of spraying devices thereon; a perforated screen in front of each spraying device; a turntable within said annular table; a card receptacle; means including a vacuum cup carried by said turntable adapted to seize a card from said receptacle and move it into vertical position; means for intermittently rotating said turntable and moving said card support to positions opposite said screens; means for actuating each spraying device only while a card is opposite the nozzle thereof and at rest whereby a color may be discharged through said screen onto the card carried by said card support; and means for releasing the card from said vacuum cup after it has passed the last screen.

11. The combination of a fixed annular table; a spraying device thereon; a perforated screen in front of said spraying device; a turntable within said annular table; vacuum controlled mechanism on said turntable for removing a card from said receptacle and holding it in vertical position; means for intermittently rotating said turntable and moving said card to a position opposite said screen; a finger on said turntable; and means operable by said finger for actuating said spraying device whereby a color may be discharged through said screen onto said card.

12. The combination of a fixed annular table; a plurality of spraying devices thereon; a perforated screen in front of each spraying device; a card receptacle on said table; a turntable within said annular table; a movable arm on said turntable; a vacuum cup on the end thereof; means for moving said cup into contact with the upper card in said receptacle; means for creating a vacuum in said cup; means for moving said arm into vertical position with the card thereon; means for intermittently rotating said turntable and causing it to come to rest when the card support is opposite each screen; and means for actuating each spraying device while said disk is at rest and in front of the nozzle thereof.

13. The combination of a fixed annular table; a spraying device thereon; a perforated screen in front of said spraying device; a turntable within said annular table; a card receptacle; means including a vacuum cup carried by said turntable adapted to seize a card from said receptacle and move it into vertical position; a shaft to which said turntable is secured; means for intermittently rotating said shaft and turntable thereby moving said card support to a position opposite said screen; means for actuating said spraying device when said turntable is at rest and the card support is opposite the nozzle of said spraying device; a valve controlling the vacuum in said cup; and means for closing the valve after the card support has passed the last screen and nozzle.

14. The combination of a fixed annular table; a spraying device thereon; a perforated screen in front of said spraying device; a turntable within said annular table; a revoluble shaft to which said turntable is secured; a card receptacle; means including a vacuum cup carried by said disk adapted to seize a card from said receptacle and move it into vertical position; means for intermittently rotating said shaft and moving said card support to a position opposite said screen; means for actuating said spraying device only while said disk is at rest whereby a color may be discharged through said screen onto the card carried by said support; and means for subsequently admitting air to said cup to release the card therefrom.

15. The combination of a fixed annular table; a spraying device thereon; a perforated screen in front of said spraying device; a turntable within said annular table; a revoluble shaft to which said turntable is secured; a card receptacle; means including a vacuum cup carried by said turntable adapted to seize a card from said receptacle and move it into vertical position; means for intermittently rotating said turntable and moving said card support to a position opposite said screen; means for actuating said spraying device only while said turntable is at rest whereby a color may be discharged through said screen onto the card carried by said support; a movable member in said receptacle provided with a divided nut; a screw coacting with said nut and rotated by said shaft; and means whereby said nut may be released from said screw to permit the lowering of the card support.

16. The combination of a fixed annular table; a spraying device thereon; a perforated screen in front of said spraying device; a turntable within said annular table; a card support on said turntable including a vacuum cup; means for intermittently rotating said turntable and moving said card support to a position opposite said screen; means for actuating said spraying device only while said turntable is at rest with said card support opposite said screen; a pump for creating a vacuum in said cup; a valve between said pump and cup controlled by the rotation of said turntable; and means for admitting air to said valve and cup at predetermined time.

17. The combination of a fixed annular table; a plurality of spraying devices thereon; a perforated screen in front of each spraying device; a turntable within said annular table; a card support on said turntable including a vacuum cup; means for intermittently rotating said turntable and moving said card support successively to positions opposite the various screens; means for actuating said spraying devices only while said turntable is at rest and the card support is opposite a screen; a vacuum pump; a valve between said pump and cup having a partition therein provided with an elongated concentric opening and dividing said casing into two chambers communicatnig respectively with said pump and with said cup; and a disk rotatable with said turntable having a port adapted to register with said elongated opening.

18. The combination of a fixed annular table; a spraying device thereon; a perforated screen in front of said spraying device; a turntable within said annular table; a card receptacle; means including a vacuum cup carried by said turntable adapted to seize a card from said receptacle and move it into vertical position; means for intermittently rotating said turntable and moving said card support to a position opposite said screen; means for actuating said spraying device only while said turntable is at rest and said card support is opposite a screen; a vacuum pump; a casing between said pump and cup having a partition dividing said casing into upper and lower chambers communicating respectively with said pump and said cup, said partition having an elongated concentric opening therethrough; a tube extending through said partition and upper chamber and open to atmosphere; and a disk in the lower chamber rotatable with said turntable and having a port therein adapted to register with said elongated opening for its entire length and subsequently register with the passage through said tube.

19. The combination of a fixed table; a plurality of spraying devices thereon; a perforated screen in front of each spraying device; a card receptacle; means including a vacuum cup carried by said disk adapted to seize a card from said receptacle and move it into vertical position; means for successively moving said card support to positions opposite said screens and temporarily bring said support to a standstill; means for actuating each spraying device only while said support is at rest and opposite a screen; and means for subsequently releasing the card from said support when it has passed the last spraying device.

20. The combination of a fixed table; a plurality of spraying devices thereon; a perforated screen in front of each spraying device; a movable table; a card receptacle depending from said table; means including a vacuum cup carried by said movable table adapted to seize a card from said receptacle and move it into vertical position; means for intermittently moving said movable table and causing said card support to come to rest opposite each screen; means for actuating said spraying device only while said card support is at rest opposite a screen; a card receiver; and means operable after said support has passed the last screen for releasing the card from said support and depositing it in said receptacle.

21. The combination of a table, a plurality of spraying devices secured thereto; a screen opposite the nozzle of each spraying device; a card support; means for moving said support successively opposite each screen and bringing it to a standstill with the card parallel to said screen; and means for actuating each spraying device only while a card is opposite the screen associated with said spraying device.

22. The combination of a table, a plurality of spraying devices secured thereto; a screen opposite the nozzle of each spraying device; a card support; means for moving said support successively opposite each screen and bringing it to a standstill with the card parallel to said screen; a paint receptacle for each spraying device; a compressed air pipe leading to each spraying device; a valve in said pipe normally closed; and means for opening said valve when the card support assumes a position opposite the nozzle of each spraying device.

23. The combination of a table, a plurality of spraying devices secured thereto; a screen opposite the nozzle of each spraying device, each screen having different shaped openings therein; a card support; means for moving said support successively opposite each screen and bringing it to a standstill with the card parallel to said screen; and means for actuating each spraying device only while a card is opposite the screen associated with said spraying device.

24. The combination of a table, a plurality of spraying devices secured thereto; a screen opposite the nozzle of each spraying device; a card support; means for moving said support successively opposite each screen and bringing it to a standstill with the card parallel to said screen; and means operable by said moving means for actuating each spraying device only while a card is opposite the screen associated with said spraying device.

25. The combination of a table, a plurality of spraying devices secured thereto; a screen opposite the nozzle of each spraying device; a card support; means for moving said support successively opposite each screen and bringing it to a standstill with the card parallel to said screen; a paint receptacle for each spraying device; a compressed air pipe leading to each spraying device; a valve in said pipe normally closed; and means operable by said moving means for opening said valve when the card support assumes a position opposite the nozzle of each spraying device.

Signed by me at 294 Washington St., Boston, Mass., this 4th day of May, 1929.

JOHN J. MURRAY.